United States Patent
Doi

(10) Patent No.: US 9,390,389 B2
(45) Date of Patent: Jul. 12, 2016

(54) ELECTRONIC DEVICE AND WORKFLOW CREATING PROGRAM THAT ENSURES COMPLICATED OPERATION

(71) Applicant: Kyocera Document Solutions Inc., Osaka (JP)

(72) Inventor: Tomihito Doi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/562,433

(22) Filed: Dec. 5, 2014

(65) Prior Publication Data

US 2015/0160971 A1 Jun. 11, 2015

(30) Foreign Application Priority Data

Dec. 5, 2013 (JP) ................... 2013-252544

(51) Int. Cl.
*G06F 9/455* (2006.01)
*G06Q 10/06* (2012.01)

(52) U.S. Cl.
CPC ....................................... *G06Q 10/06* (2013.01)

(58) Field of Classification Search
CPC ..................................................... G06F 9/4843
USPC ....................................................... 718/1–108
See application file for complete search history.

(56) References Cited

U.S. PATENT DOCUMENTS 7,448,046 B2* 11/2008 Navani ................... G06Q 10/06
 705/37
7,607,130 B2* 10/2009 Singh .................... G06Q 10/10
 707/999.001
2003/0061266 A1* 3/2003 Ouchi .................... G06Q 10/06
 718/106

(Continued)

FOREIGN PATENT DOCUMENTS

| JP | 2004-287837 A | 10/2004 |
|---|---|---|
| JP | 2004-287859 A | 10/2004 |
| JP | 2004-287861 A | 10/2004 |
| JP | 2011-254514 A | 12/2011 |

OTHER PUBLICATIONS

Van der Aalst, W. M. P. "On the automatic generation of workflow processes based on product structures." Computers in Industry 39.2 (1999): pp. 97-111.*

(Continued)

*Primary Examiner* — Satish Rampuria
(74) *Attorney, Agent, or Firm* — James Judge

(57) ABSTRACT

An electronic device includes a function accepting unit, an execution condition accepting unit, and a workflow creating unit. The function accepting unit accepts functions. The execution condition accepting unit accepts at least one execution condition of the functions. The workflow creating unit creates a workflow combining a plurality of functions. The workflow creating unit creates the workflow including the functions and the execution condition. The functions are accepted by the function accepting unit. The execution condition is accepted by the execution condition accepting unit. The execution condition accepting unit accepts a continuation condition as at least one of the execution condition, the continuation condition for starting execution of a subsequent function after termination of execution of the function immediately before without selecting the subsequent function.

12 Claims, 8 Drawing Sheets

(56) References Cited

U.S. PATENT DOCUMENTS

| | | |
|---|---|---|
| 2004/0194010 A1 | 9/2004 | Kirihara et al. |
| 2004/0199399 A1 | 10/2004 | Sugiyama |
| 2005/0027825 A1 | 2/2005 | Hikawa et al. |
| 2009/0158289 A1* | 6/2009 | Toub .................. G06F 9/5038 718/104 |
| 2009/0164985 A1* | 6/2009 | Balko .................. G06Q 10/06 717/162 |

OTHER PUBLICATIONS

Müller, Robert, Ulrike Greiner, and Erhard Rahm. "Agentwork: a workflow system supporting rule-based workflow adaptation." Data & Knowledge Engineering 51.2 (2004): pp. 223-256.*

Miller, John A., et al. "WebWork: METEOR2's web-based workflow management system." Journal of Intelligent Information Systems 10.2 (1998): pp. 185-215.*

* cited by examiner

ELECTRONIC DEVICE AND WORKFLOW CREATING PROGRAM THAT ENSURES COMPLICATED OPERATION

INCORPORATION BY REFERENCE

This application is based upon, and claims the benefit of priority from, corresponding Japanese Patent Application No. 2013-252544 filed in the Japan Patent Office on Dec. 5, 2013, the entire contents of which are incorporated herein by reference.

BACKGROUND

Unless otherwise indicated herein, the description in this section is not prior art to the claims in this application and is not admitted to be prior art by inclusion in this section.

There is an electronic device that creates a workflow combining a plurality of functions.

SUMMARY

An electronic device according to an aspect of the disclosure includes a function accepting unit, an execution condition accepting unit, and a workflow creating unit. The function accepting unit accepts functions. The execution condition accepting unit accepts at least one execution condition of the functions. The workflow creating unit creates a workflow combining a plurality of the functions. The workflow creating unit creates the workflow including the functions and the execution condition. The functions are accepted by the function accepting unit. The execution condition is accepted by the execution condition accepting unit. The execution condition accepting unit accepts a continuation condition as at least one of the execution condition, the continuation condition for starting execution of a subsequent function after termination of execution of the function immediately before without selecting the subsequent function.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
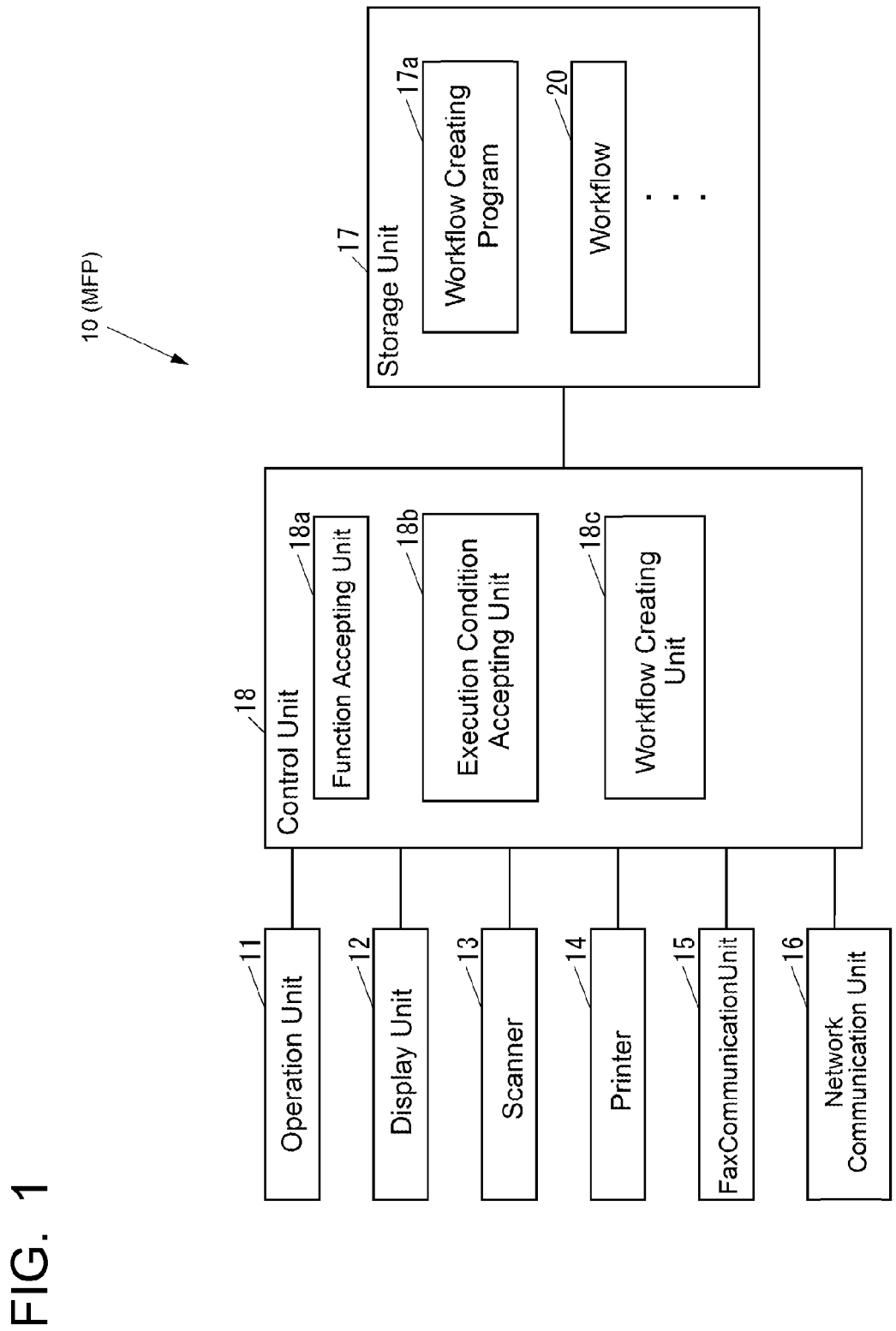
FIG. 1 illustrates a block diagram of an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure using the drawings.

First, a configuration of a Multifunction Peripheral (MFP) as an electronic device according to the embodiment will be described.

FIG. 1 illustrates a block diagram of an MFP 10 according to the embodiment.

As illustrated in FIG. 1, the MFP 10 includes an operation unit 11, a display unit 12, a scanner 13, a printer 14, a fax communication unit 15, a network communication unit 16, a storage unit 17, and a control unit 18. The operation unit 11 is an input device such as a button for inputting various operations by a user. The display unit 12 is a display device such as a Liquid Crystal Display (LCD) that displays various types of information. The scanner 13 is a reading device that reads an image from an original document. The printer 14 is a print device that executes a print job on a recording medium such as a paper sheet. The fax communication unit 15 is a fax device that performs fax communication with an external facsimile device via a communication line such as a dial-up line. The network communication unit 16 is a network communication device that communicates with an external device via the network such as Local Area Network (LAN) and Internet. The storage unit 17 is a non-volatile storage device such as an Electrically Erasable Programmable Read Only Memory (EEPROM) and a Hard Disk Drive (HDD) that store various data. The control unit 18 controls the entire MFP 10.

The storage unit 17 can store a plurality of workflows 20 that each combine a plurality of functions.

The storage unit 17 stores a workflow creating program 17a that causes the MFP 10 to create the workflow 20. The workflow creating program 17a may be installed on the MFP 10 at a production stage of the MFP 10, may be additionally installed on the MFP 10 from a storage medium such as an SD card and a Universal Serial Bus (USB) memory, or may be additionally installed on the MFP 10 via a network.

Figure 2:
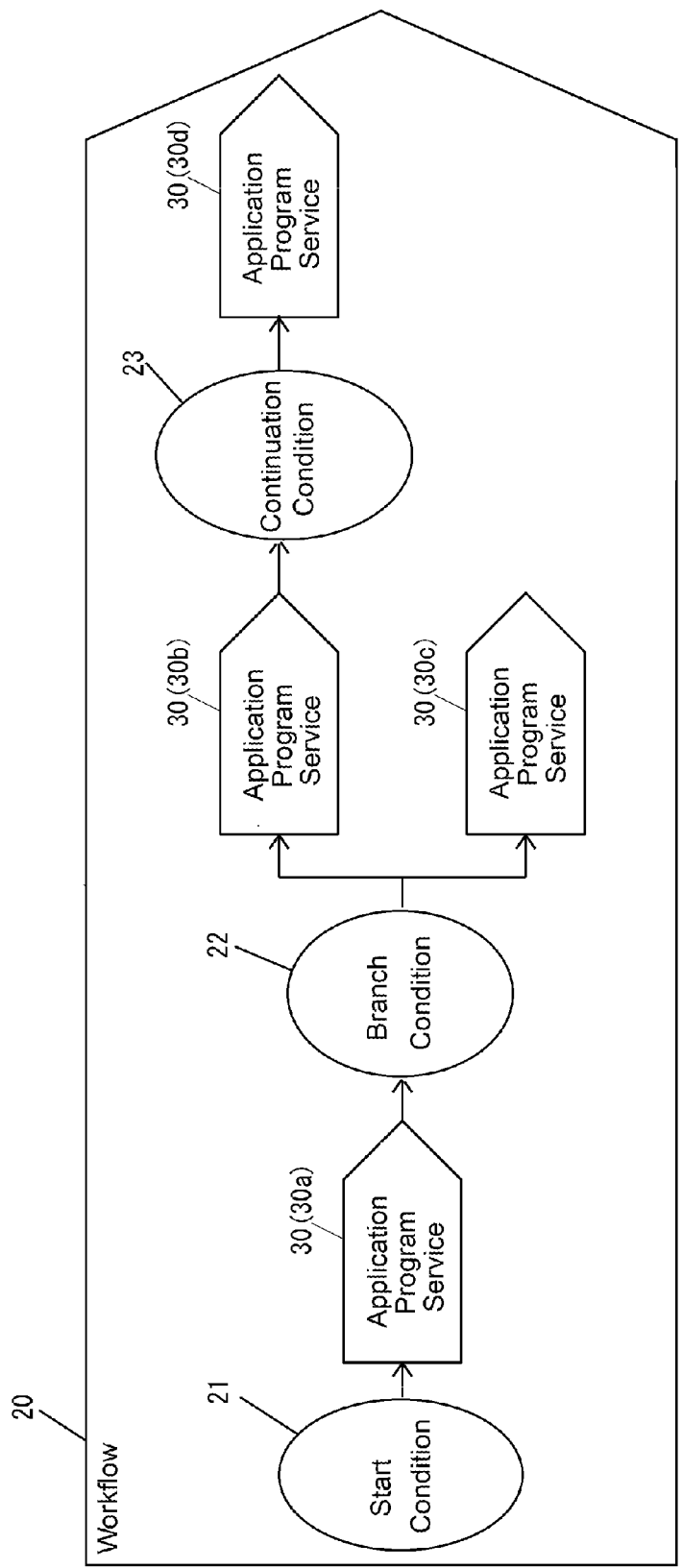
FIG. 2 illustrates an exemplary workflow created by the MFP according to the embodiment.

FIG. 2 illustrates an example of the workflow 20 created by the MFP 10.

As illustrated in FIG. 2, the workflow 20 can include an application program service 30 that is a combination of a plurality of functions (see FIG. 2 for application program services 30a, 30b, 30c, and 30d). As an execution condition of the application program service 30a, the workflow 20 can include a start condition 21 to start the execution of the workflow 20. As the execution condition of the application program service 30b and 30c, the workflow 20 can include a branch condition 22. After the previous execution of the application program service 30a terminates, the branch condition 22 selects the subsequent application program service 30b or 30c, and starts the execution of the subsequent application program service 30b or 30c. As the execution condition of the application program service 30d, the workflow 20 can include a continuation condition 23. After the previous execution of the application program service 30b terminates, the continuation condition 23 starts the execution of the subsequent application program service 30*d* without selecting the subsequent application program service 30*d*.

In FIG. 2, the positional relationship of the start condition 21, the branch condition 22, the continuation condition 23, and the application program services 30*a* to 30*d* indicates the order of the execution of each process. That is, at the workflow 20 illustrated in FIG. 2, the start condition 21 is executed at first. Next, the application program service 30*a*, which is at the right side of the start condition 21, is executed. Next, the branch condition 22, which is at the right side of the application program service 30*a*, is executed. Then, any one of the two application program services 30*b* and 30*c*, which are at the above or below right of the branch condition 22, is executed. When the application program service 30*c*, which is at the below right of the branch condition 22, is executed, the execution of the workflow 20 is terminated. On the other hand, when the application program service 30*b*, which is at the above right of the branch condition 22, is executed, the continuation condition 23, which is at the right side of the application program service 30*b*, is executed. Then, the application program service 30*d*, which is at the right side of the continuation condition 23, is executed, and the execution of the workflow 20 is terminated.

The workflow 20 can include plural kinds of the application program service 30. For example, as the application program service 30, the following are applicable.
(1) An application program service relating to "copying";
(2) An application program service relating to "transmit";
(3) An application program service relating to "FAX"; and
(4) An application program service relating to "maintenance."

The workflow 20 can include plural kinds of the start condition 21. For example, as the start condition 21, following conditions are applicable.
(1) Starting the execution of the specific application program service 30 outside the workflow 20 including the start condition 21 itself;
(2) Terminating the execution of the specific application program service 30 outside the workflow 20 including the start condition 21 itself;
(3) Changing the state of the execution of the specific application program service 30 outside the workflow 20 including the start condition 21 itself;
(4) A specific result of the execution of the specific application program service 30 outside the workflow 20 including the start condition 21 itself; and
(5) Changing the specific setting of the MFP 10.
Here, as to change the state of the execution of the application program service 30, for example, changing the state of execution of the application program service 30 to the state of halt is applicable. As to change the specific setting of the MFP 10, for example, changing the setting of a continuous reading mode in copying from ON to OFF is applicable.

The workflow 20 can include plural kinds of the branch condition 22. For example, as the branch condition 22, following conditions are applicable.
(1) Starting the execution of the specific application program service 30 outside the workflow 20 including the branch condition 22 itself;
(2) Terminating the execution of the specific application program service 30 outside the workflow 20 including the branch condition 22 itself;
(3) Changing the state of the execution of the specific application program service 30 outside the workflow 20 including the branch condition 22 itself;
(4) A specific result of the execution of the specific application program service 30 outside the workflow 20 including the branch condition 22 itself;
(5) A specific result of the execution of the specific application program service 30 in the workflow 20 including the branch condition 22 itself;
(6) Changing the specific setting of the MFP 10; and
(7) Receiving an instruction that any one of the subsequent application program services 30 should be started to execute.

The branch condition 22 is set which application program service 30 among the subsequent application program services 30 should be selected to start executing corresponding to the accepted conditions.

Figure 3:
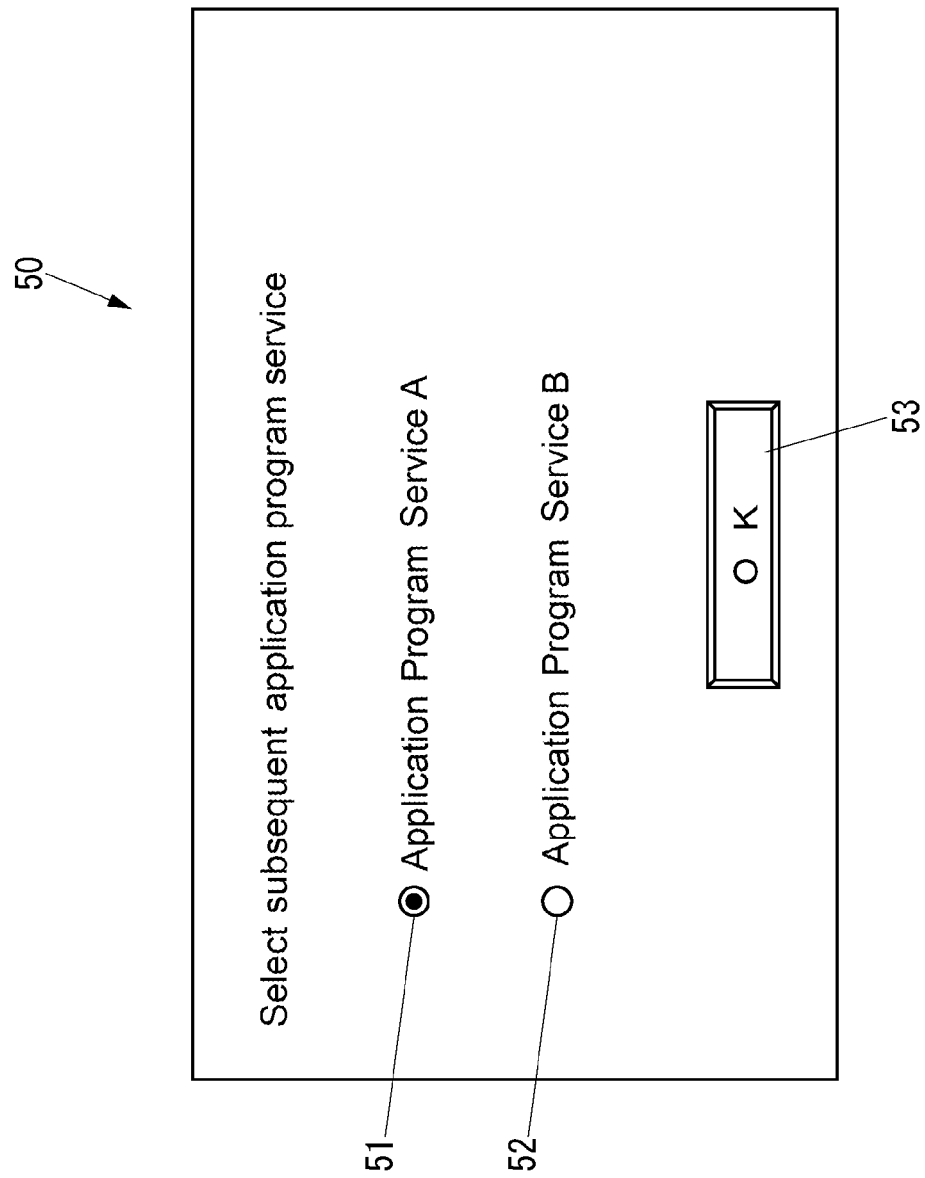
FIG. 3 illustrates an exemplary screen displayed on a display unit according to the embodiment.

When "receiving an instruction that any of the subsequent application program service 30 should be started to execute" is accepted, the branch condition 22 is set to cause the display unit 12 to display a screen 50 (illustrated in FIG. 3) for example. Then, the user instructs which of the subsequent application program services 30 to start executing via the operation unit 11. Here, the screen 50 includes a radio button 51 for causing a user to select an application program service A, a radio button 52 for causing a user to select an application program service B, and an OK button 53 for instructing the application program service that has been selected by touching the radio button 51 or radio button 52 to the MFP 10. On the screen 50, only one of the radio button 51 or radio button 52 is always selected. Then, the branch condition 22 is set to select an application program service 30 to start executing, among the subsequent application program services 30, corresponding to the instruction that is received via the operation unit 11.

Accordingly, when "to receive an instruction that any of the subsequent application program service 30 should be started to execute" is accepted, the branch condition 22 may be set to use an external electronic device. That is, at the branch condition 22, the screen 50 illustrated in FIG. 3 can be displayed not on the display unit 12 but on a display unit of an external electronic device such as Personal Computer (PC) via the network communication unit 16, and the instruction by the user can be received not from the operation unit 11 but from an operation unit of the external electronic device via the network communication unit 16.

The workflow 20 can include plural kinds of the continuation condition 23. For example, as the continuation condition 23, the following conditions are applicable.
(1) Starting the execution of the specific application program service 30 outside the workflow 20 including the continuation condition 23 itself;
(2) Terminating the execution of the specific application program service 30 outside the workflow 20 including the continuation condition 23 itself;
(3) Changing the state of the execution of the specific application program service 30 outside the workflow 20 including the continuation condition 23 itself;
(4) A specific result of the execution of the specific application program service 30 outside the workflow 20 including the continuation condition 23 itself;
(5) Changing the specific setting of the MFP 10;
(6) A specific result of the execution of the specific application program service 30 in the workflow 20 including the continuation condition 23 itself; and
(7) Receiving an instruction to start executing of the subsequent application program service 30.

Figure 4:
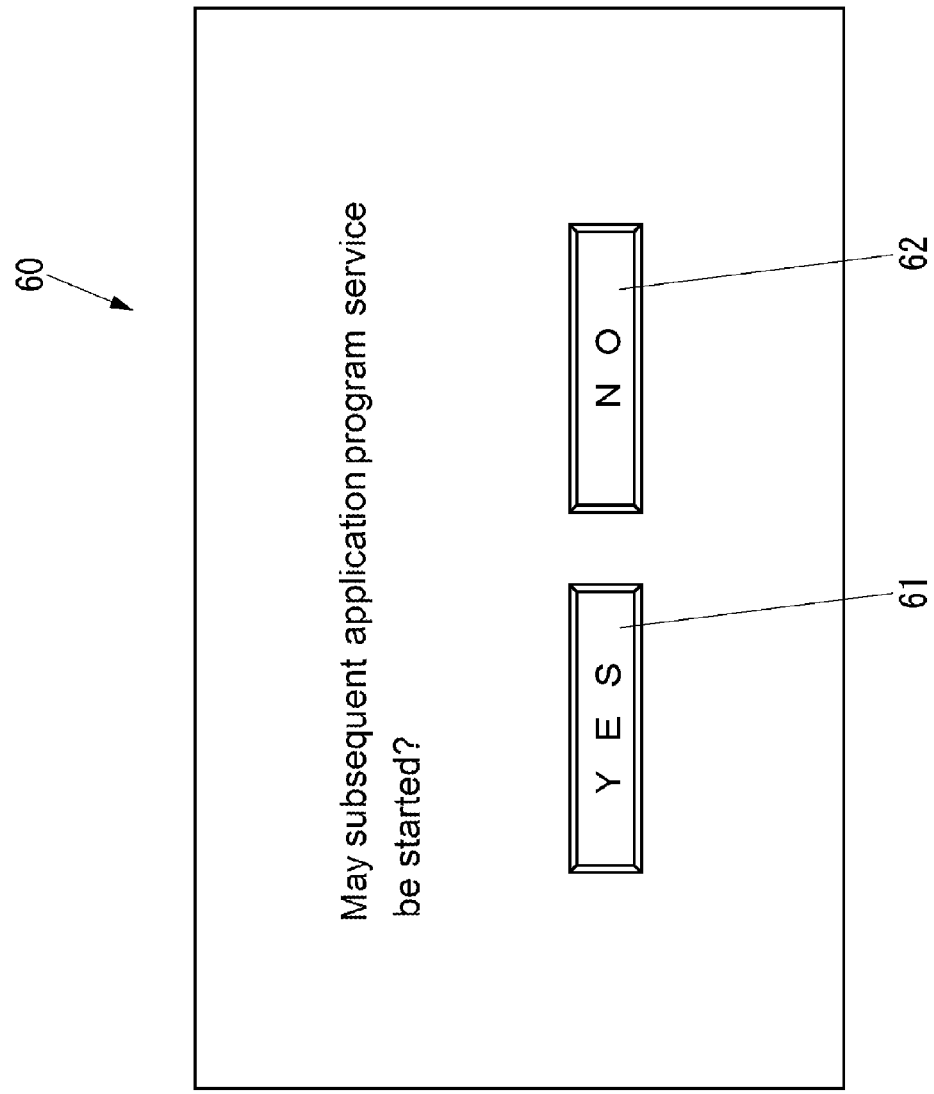
FIG. 4 illustrates another exemplary screen displayed on the display unit according to the embodiment.

When "receiving an instruction to start executing of the subsequent application program service 30" is accepted, the continuation condition 23 is set to cause the display unit 12 to display a screen 60 (illustrated in FIG. 4) for example. Then, the user instructs whether or not to start executing of the subsequent application program service 30 via the operation unit 11. Here, the screen 60 includes a YES button 61 for instructing the MFP 10 to start executing of the subsequent application program service 30 and a NO button 62 for instructing the MFP 10 not to start executing of the subsequent application program service 30. The continuation condition 23 may be set to use an external electronic device. That is, at the continuation condition 23, the screen 60 illustrated in FIG. 4 can be displayed not on the display unit 12 but on a display unit of an external electronic device such as PC via the network communication unit 16, and the instruction by the user can be received not from the operation unit 11 but from an operation unit of the external electronic device via the network communication unit 16.

Figure 5:
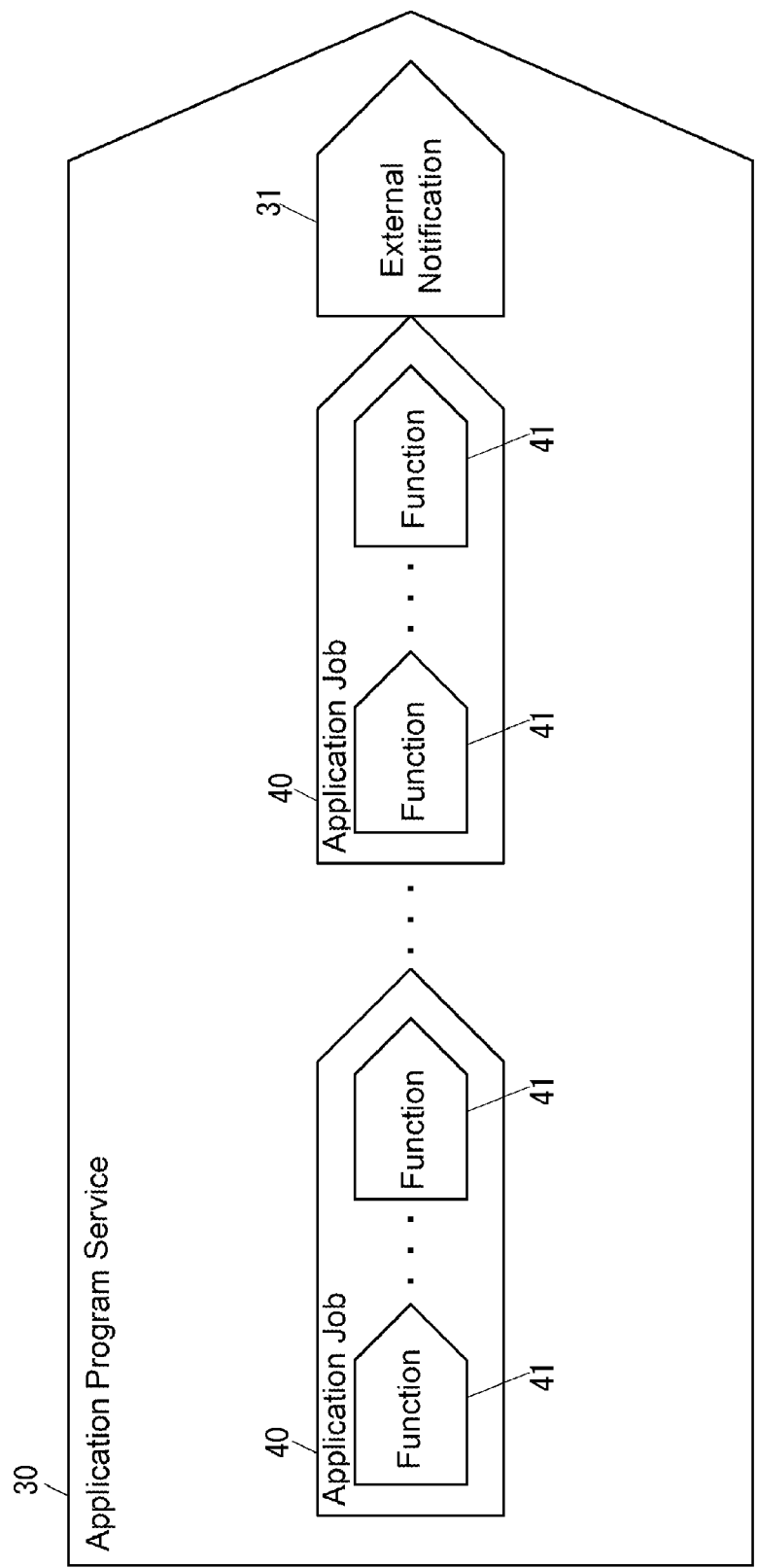
FIG. 5 illustrates an exemplary application program service according to the embodiment.

FIG. 5 illustrates an example of the application program service 30.

As illustrated in FIG. 5, the application program service 30 can include an application job 40 that combines a plurality of functions 41. The application program service 30 can also include an external notification 31 that notifies termination of executing all the application jobs 40 included in the application program service 30 itself to the external electronic device of the MFP 10 via the network communication unit 16.

In FIG. 5, each of the processes is executed in order from the right to the left, similarly to FIG. 2.

The application program service 30 can include plural kinds of the application job 40. One application job 40 can process only one document when the job is to process documents. On the other hand, the application program service 30 can process a plurality of documents when the job is to process documents.

The application job 40 is constituted as the combination of a plurality of the functions 41. Then, the application program service 30 including the application job 40 is constituted as the combination of a plurality of the functions 41. Accordingly, the workflow 20 including the application program service 30 is constituted as the combination of a plurality of the functions 41.

For example, assuming a Box print job that prints image data, which is in a User Box assigned to each user as a storage region in the storage unit 17, by the printer 14. The application job 40 is constituted as the combination of a function 41 that takes out image data from the User Box and a function 41 that prints image taken out from the User Box by the printer 14.

The control unit 18 illustrated in FIG. 1 includes, for example, a Central Processing Unit (CPU), a Read Only Memory (ROM) that stores the program and various kinds of data, and Random Access Memory (RAM) that is used as a work area of the CPU. CPU executes the program that is stored in the ROM or the storage unit 17.

Executing the workflow creating program 17a, which is stored in the storage unit 17, causes the control unit 18 to operate as a function accepting unit 18a, an execution condition accepting unit 18b, and a workflow creating unit 18c. The function accepting unit 18a accepts the application program service 30 as the function 41. The execution condition accepting unit 18b accepts at least one of the start condition 21, the branch condition 22, and the continuation condition 23, as an execution condition of at least one of the application program service 30. The workflow creating unit 18c creates the workflow 20.

Next, a description will be given of the operation of the MFP 10 when creating the workflow 20.

Figure 6:
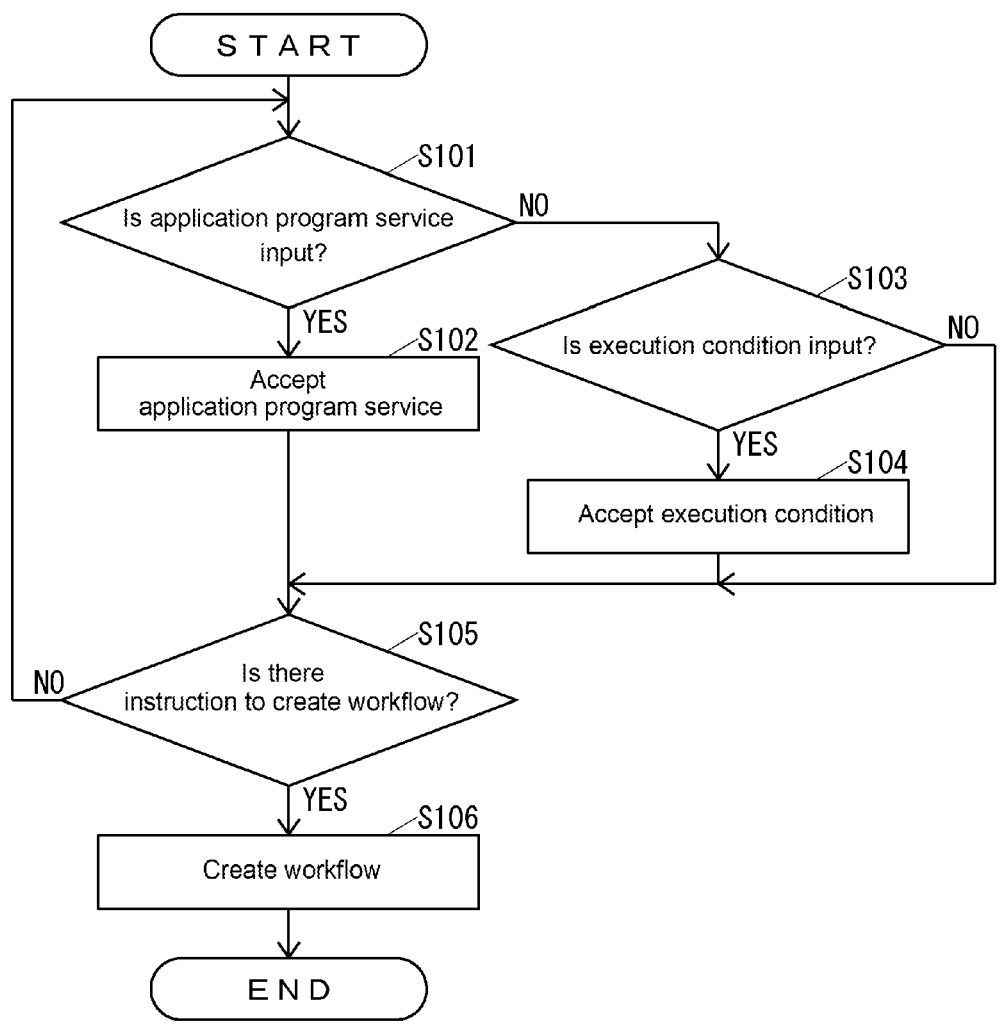
FIG. 6 illustrates an operation of the MFP according to the embodiment when the MFP creates a workflow.

First, starting the process of creating the workflow 20 is instructed via the operation unit 11, and then the MFP 10 starts the operation illustrated in FIG. 6.

FIG. 6 illustrates the operation of the MFP 10 when creating the workflow 20.

As illustrated in FIG. 6, the function accepting unit 18a in the control unit 18 determines whether or not the application program service 30 is input from the operation unit 11 or from an external electronic device via the network communication unit 16 (S101). When the application program service 30 is input from the external electronic device via the network communication unit 16, the application program service 30 is input to the function accepting unit 18a from the external electronic device by Web service.

When an application program service 30 is determined to be input at S101, the function accepting unit 18a accepts the application program service 30 (S102). When at least one of the start condition 21, the branch condition 22, the continuation condition 23, and the application program service 30 has been already accepted, the function accepting unit 18a causes the display unit 12 to accept a positional relationship such as illustrated in FIG. 2 (for example) from the operation unit 11 and display it. That is, the positional relationship among the already accepted object, which is the start condition 21, the branch condition 22, the continuation condition 23, or the application program service 30, and another application program service 30 that is newly accepted at S102 is displayed. The positional relationship can be accepted from the external electronic device via the network communication unit 16, and the positional relationship is displayed on the display unit of the external electronic device via the network communication unit 16.

When any of the application program services 30 is determined not to be input at S101, the execution condition accepting unit 18b in the control unit 18 determines whether or not the start condition 21, the branch condition 22, or the continuation condition 23 is input from the operation unit 11 or from the external electronic device via the network communication unit 16 (S103). When the execution condition is input from the external electronic device via the network communication unit 16, the execution condition is input from the external electronic device by a Web service.

When any of the start condition 21, the branch condition 22, or the continuation condition 23 is determined to be input at S103, the execution condition accepting unit 18b accepts the start condition 21, the branch condition 22, or the continuation condition 23 (S104). When at least one of the start condition 21, the branch condition 22, the continuation condition 23, and the application program service 30 has been already accepted, the execution condition accepting unit 18b causes the display unit 12 to accept a positional relationship such as illustrated in FIG. 2 (for example) from the operation unit 11 and display it. That is, the positional relationship among the already accepted object, which is the start condition 21, the branch condition 22, the continuation condition 23, or the application program service 30, and the start condition 21, the branch condition 22, or the continuation condition 23 that is newly accepted at S104 is displayed. The positional relationship can be accepted from the external electronic device via the network communication unit 16, and in this case, the positional relationship is displayed on the display unit of the external electronic device via the network communication unit 16.

The workflow creating unit 18c of the control unit 18 determines whether or not an instruction to create the workflow 20 is transferred from the operation unit 11 or from the external electronic device via the network communication unit 16 in the following situations (S105).

(1) A situation when the process of S102 terminates;
(2) A situation when any of the start condition 21, the branch condition 22, and the continuation condition 23 is determined not to be input at S103; and
(3) A situation when the process of S104 terminates.

The workflow creating unit 18c causes the function accepting unit 18a to execute the process of S101 when the instruction to create the workflow 20 is determined not to be transferred at S105.

When the instruction to create a workflow 20 is determined to be transferred at S105, the workflow creating unit 18c creates the workflow 20 on the storage unit 17 (S106). The workflow 20 is created by at least one of the start condition 21, the branch condition 22, the continuation condition 23 and application program service 30, which is accepted at S102 or S104, on the display unit 12 or on the display unit of the external electronic device. Then, the workflow creating unit 18c terminates the operation illustrated in FIG. 6.

Figure 7:
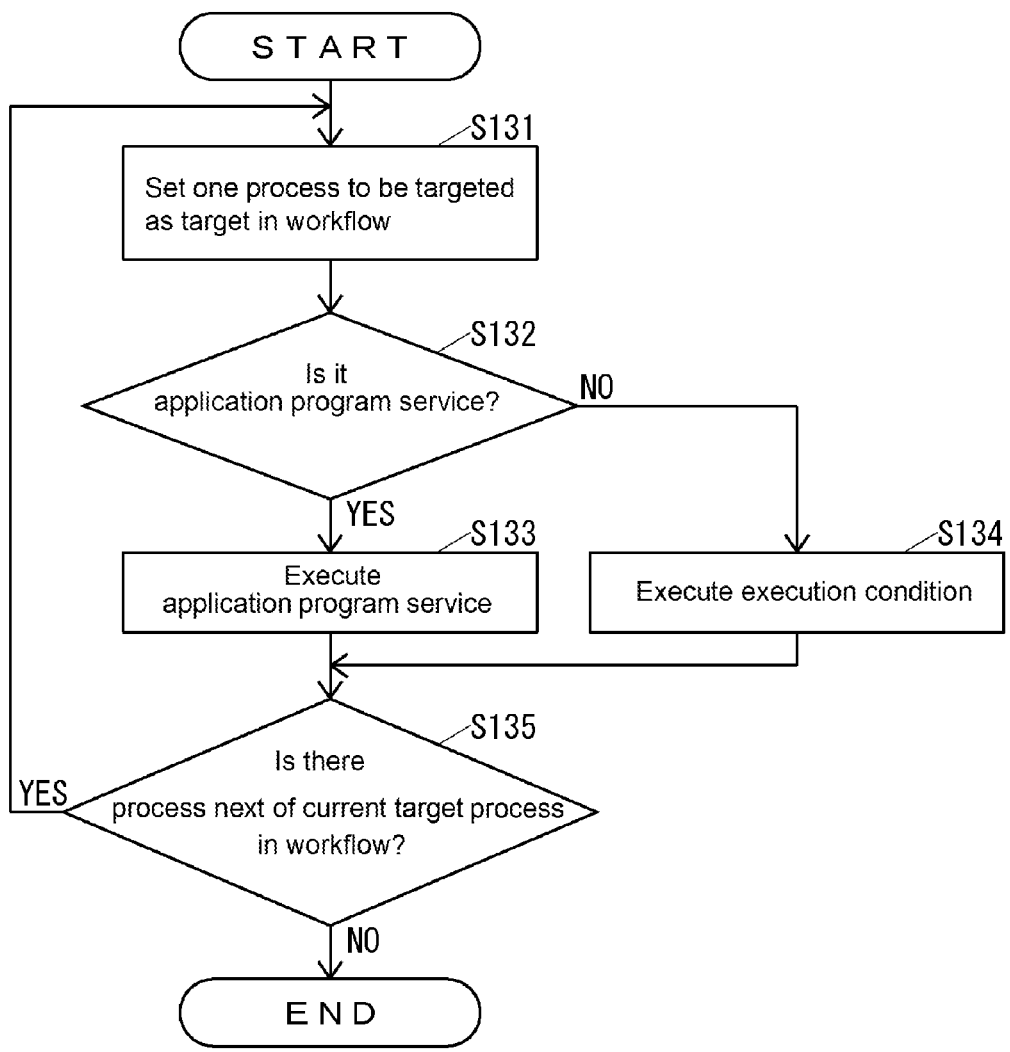
FIG. 7 illustrates an operation of the MFP according to the embodiment when the workflow is stored in a storage unit.

Next, the MFP 10 starts the operation illustrated in FIG. 7 when the workflow 20 is stored in the storage unit 17.

FIG. 7 illustrates the operation of the MFP 10 when the workflow 20 is stored in the storage unit 17.

As illustrated in FIG. 7, the control unit 18 sets a process that is to be targeted as the target (S131). A process that is to be targeted is one of a process among the start condition 21, the branch condition 22, the continuation condition 23 and application program service 30, which is in the workflow 20 stored in the storage unit 17 and has not been set as the target. Here, a process to be targeted is a process that is the first in the order when there is no process targeted in the workflow 20. When there is a process targeted in the workflow 20, a process that is to be targeted is a process that is to be targeted next of the current target process.

The control unit 18 determines whether or not the current target process is an application program service 30 after the process of S131 terminates (S132).

When the control unit 18 determines at S132 that the current target process is an application program service 30, the control unit 18 executes the application program service 30 as the current target process (S133).

When the control unit 18 determines at S132 that the current target process is not an application program service 30, the control unit 18 executes one of the start condition 21, the branch condition 22 or continuation condition 23 as an execution condition that is the current target process (S134).

The control unit 18 determines whether or not there is a process next of the current target process in the workflow 20, after the process of S133 or S134 terminates (S135).

When the control unit 18 determines at S135 that there is a process next of the current target process, the control unit 18 executes the process of S131.

When the control unit 18 determines at S135 that there is not a process next of the current target process, the control unit 18 terminates the operation illustrated in FIG. 7.

The control unit 18 executes the operation illustrated in FIG. 7 repeatedly to each of all the workflows 20 stored in the storage unit 17.

A description will be given of the case where the operation illustrated in FIG. 7 is executed to the workflow 20 illustrated in FIG. 2.

The control unit 18 sets the start condition 21, which is the first process of the workflow 20, as the target (S131).

Next, the control unit 18 executes the start condition 21 that is the current target process (NO at S132, and S134). That is, the control unit 18 continues to execute the process of S134 until the start condition 21 is satisfied.

When the start condition 21 is satisfied, the control unit 18 sets the application program service 30a, which is the next process of the start condition 21, as the target (S131) because there is a process next of the start condition 21, which is the current target process, in the workflow 20 (YES at S135).

Next, after the control unit 18 executes the application program service 30a as the current target process (YES at S132, and S133), the control unit 18 sets the branch condition 22, which is the next process of the application program service 30a as the current target process, as the target (S131) because there is a process next of the application program service 30a, which is the current target process, in the workflow 20 (YES at S135).

Next, the control unit 18 executes the branch condition 22 that is the current target process (NO at S132, and S134). That is, the control unit 18 continues to execute the process of S134 until the branch condition 22 is satisfied.

Assume that the branch condition 22 is satisfied. In the workflow 20, there is a process next of the branch condition 22 that is the current target process (YES at S135). Then, the control unit 18 sets an application program service 30, which is selected by the branch condition 22, of two application program services 30, which are at the right side above and below the branch condition 22 in FIG. 2, as the target (S131).

For example, assume that the control unit 18 sets the application program service 30c, which is at the right side below the branch condition 22 in FIG. 2, as the target at S131. After the application program service 30c as the current target process is executed (YES at S132 and S133), the control unit 18 terminates the execution of the workflow 20 because there is not a process next of the application program service 30c as the current target process in the workflow 20 (NO at S135).

On the other hand, assume that the control unit 18 sets the application program service 30b, which is at the right side above the branch condition 22 in FIG. 2, as the target at S131. After the application program service 30b as the current target process is executed (YES at S132 and S133), the control unit 18 sets the continuation condition 23, which is the next process of the application program service 30b as the current target process, as the target (S131) because there is a process next of the application program service 30b as the current target process in the workflow 20 (YES at S135).

Next, the control unit 18 executes the continuation condition 23 as the current target process (NO at S132 and S134). That is, the control unit 18 continues to execute the process of S134 until the continuation condition 23 is satisfied.

After the continuation condition 23 is satisfied, the control unit 18 sets the application program service 30d that is the next process of the continuation condition 23 as the target (S131) because there is a process next of the continuation condition 23 as the current target process in the workflow 20 (YES at S135).

Next, after the application program service 30d as the current target process is executed (YES at S132 and S133), the control unit 18 terminates the execution of the workflow 20 because there is not a process next of the application program service 30d as the current target process in the workflow 20 (NO at S135).

The control unit 18 executes the operation illustrated in FIG. 7 repeatedly to the workflow 20, which is stored in the storage unit 17, illustrated in FIG. 2.

The following describes an example of the operation of FIG. 6 and the operation of FIG. 7.

Figure 8:
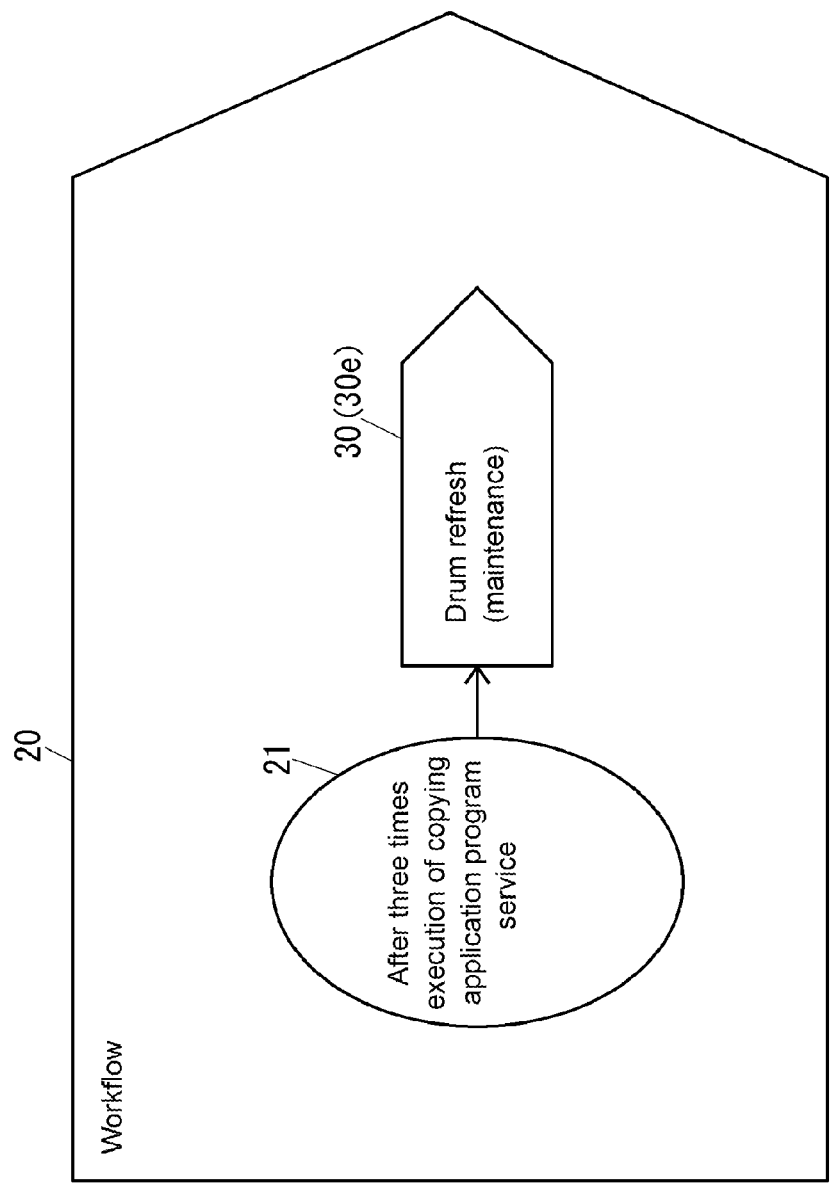
FIG. 8 illustrates an example of the workflow according to the embodiment.

Assume that the workflow 20 illustrated in FIG. 8 is created on the storage unit 17 by the operation illustrated in FIG. 6.

FIG. 8 illustrates an example of the workflow 20.

In FIG. 8, the workflow 20 includes "three times occurring of terminating the execution of the copying application program service 30, which is outside of the workflow 20 including the start condition 21 itself" as the start condition 21. The workflow 20 includes a drum refresh (maintenance) as the application program service 30e.

Here, the drum refresh is an application program service that polishes the surface of the photoreceptor drum to improve the quality of next printing by the printer 14, using the toner, which is transferred onto the surface of the photoreceptor drum of the printer 14, for a polishing-agent.

The control unit 18, which executes the operation illustrated in FIG. 7 to the workflow 20 illustrated in FIG. 8, sets the start condition 21, which is the first process of the workflow 20, as the target (S131).

Next, the control unit 18 executes the start condition 21 as the current target process (NO at S132, and S134). That is, after the control unit 18 sets the value of the counter to count the number of execution of the copying application program service 30 to 0, the control unit 18 continues to execute the process of S134 until the start condition 21 is satisfied.

Here, assume that the MFP 10 executes, for example, the copying application program service 30 once in response to the instruction from the operation unit 11, regardless of the workflow 20 illustrated in FIG. 8.

This causes the control unit 18, which is executing the operation illustrated in FIG. 7 to the workflow 20 illustrated in FIG. 8, to set the value of the counter from 0 to 1. However, as the value of the counter is not yet 3, the control unit 18 still continues to execute the process of S134 until the start condition 21 is satisfied.

Further, assume that the MFP 10 executes, for example, the copying application program service 30 once in response to the instruction from the operation unit 11, regardless of the workflow 20 illustrated in FIG. 8.

This causes the control unit 18, which is executing the operation illustrated in FIG. 7 to the workflow 20 illustrated in FIG. 8, to set the value of the counter from 1 to 2. However, as the value of the counter is not yet 3, the control unit 18 still continues to execute the process of S134 until the start condition 21 is satisfied.

Further, assume that the MFP 10 executes, for example, the copying application program service 30 once in response to the instruction from the operation unit 11, regardless of the workflow 20 illustrated in FIG. 8.

This causes the control unit 18, which is executing the operation illustrated in FIG. 7 to the workflow 20 illustrated in FIG. 8, to set the value of the counter from 2 to 3. The control unit 18 determines that the start condition 21 is satisfied because the value of the counter is set to 3.

When the start condition 21 is satisfied, the control unit 18 sets the application program service 30 (30e, see FIG. 8), which is the next process of the start condition 21, as the target (S131) because there is a process next of the start condition 21 as the current target process in the workflow 20 (YES at S135).

Next, after the control unit 18 executes the application program service 30e as the current target process, that is, the drum refresh (YES at S132, and S133), the control unit 18 terminates the execution of the workflow 20 because there is not the process next of the application program service 30e as the current target process in the workflow 20 (NO at S135).

The control unit 18 executes the operation illustrated in FIG. 7 repeatedly to the workflow 20, which is stored in the storage unit 17, illustrated in FIG. 8. Accordingly, the control unit 18 executes the drum refresh every three times of executing copying.

As described above, the MFP 10 creates the workflow 20 that includes the continuation condition 23 to start the execution of a subsequent function 41 without selecting the subsequent function 41 when there is another function 41 subsequently after the execution of the function 41 terminates (S106). Then, the MFP 10 can cause the subsequent function 41 not to start executing until the continuation condition 23 is satisfied (S134). Accordingly, the MFP 10 can create the workflow 20 that ensures the complicated operation compared with the configuration that starts executing of the subsequent function 41 instantly.

When creating a workflow 20, the MFP 10 can create the workflow 20 that includes the execution condition of the function 41 outside of the workflow 20 as at least one of the execution condition. When creating the similar workflow 20, the MFP 10 can execute a specific function 41 of the workflow 20 corresponding to the execution condition of the function 41 outside of the workflow 20 while the workflow 20 is executed. Accordingly, the MFP 10 can create the workflow 20 that ensures the complicated operation. For example, as the execution condition of the function 41 outside of the workflow 20, the following conditions are applicable:

(1) Starting the execution of the specific application program service 30 outside the workflow 20;
(2) Terminating the execution of the specific application program service 30 outside the workflow 20; and
(3) Changing the state of the execution of the specific application program service 30 outside the workflow 20.

When creating a workflow 20, the MFP 10 can create the workflow 20 that includes the result of execution of the function 41 outside of the workflow 20 as at least one of the execution condition. When creating the similar workflow 20, the MFP 10 can execute the specific function 41 of the workflow 20 corresponding to the result of execution of the function 41 outside of the workflow 20 while the workflow 20 is executed. Accordingly, the MFP 10 can create the workflow 20 that ensures the complicated operation.

The MFP 10 can create the workflow 20 that includes the change of the specific setting of the MFP 10 as at least one of the execution condition. When creating the similar workflow 20, the MFP 10 can execute the specific function 41 of the workflow 20 corresponding to the change of the specific setting of the MFP 10 while the workflow 20 is executed. Accordingly, the MFP 10 can create the workflow 20 that ensures the complicated operation.

The electronic device of the disclosure is an MFP according to the embodiment. However, the electronic device may be an image forming apparatus other than the MFP such as a printer-only machine, a copy-only machine, a FAX-only machine, or may be an electronic device other than the image forming apparatus such as PC, as long as an electronic device that can create a workflow combining a plurality of functions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electronic device, comprising:
   a workflow creating unit that creates workflows constituted by combinations of multifunction-peripheral functions, the functions including
      execution-start conditions for starting execution of a workflow,
      continuation conditions for starting execution of a subsequent function after termination of execution of an immediately previous function, without selection of the subsequent function, and
      branch conditions for causing selection of a subsequent function from a plurality of functions, and starting execution of the selected subsequent function after termination of execution of an immediately previous function;
   a function accepting unit that accepts the workflow functions; and
   an execution condition accepting unit that accepts at least any one of the execution-start conditions, the continuation conditions, and the branch conditions as an at least one execution condition, the execution condition accepting unit therein accepting the status of execution of a function other than the workflow that contains said at least one execution condition itself, as the at least any one of the execution-start conditions, the continuation conditions, and the branch conditions; wherein the workflow creating unit operates to create workflows including functions accepted by the function accepting unit, and said at least one execution condition accepted by the execution condition accepting unit.

2. The electronic device according to claim 1, wherein:
the execution condition accepting unit accepts as the at least any one of the execution-start conditions the status of execution of a function other than the workflow that contains said at least any one execution-start condition itself.

3. The electronic device according to claim 1, wherein:
the execution condition accepting unit accepts as the at least any one of the execution-start conditions, the continuation conditions, and the branch conditions result of execution of a function other than the workflow that contains said at least one execution condition itself.

4. The electronic device according to claim 1, wherein:
the execution condition accepting unit accepts a change in a specific setting of the electronic device as the at least one execution condition.

5. A non-transitory computer-readable recording medium storing a workflow creating program executable in a computer of an electronic device, the workflow creating program comprising:

a first program code that causes the computer to accept multifunction-peripheral functions, the functions including
  execution-start conditions for starting execution of a workflow,
  continuation conditions for starting execution of a subsequent function after termination of execution of an immediately previous function, without selection of the subsequent function, and
  branch conditions for causing selection of a subsequent function from a plurality of functions, and starting execution of the selected subsequent function after termination of execution of an immediately previous function;

a second program code that causes the computer to accept at least any one of the execution-start conditions, the continuation conditions, and the branch conditions as an at least one execution condition, the computer therein accepting the status of execution of a function other than the workflow that contains said at least one execution condition itself, as the at least any one of the execution-start conditions, the continuation conditions, and the branch conditions; and a third program code that causes the computer to create workflows constituted by combinations of the functions; wherein the third program code causes the computer to create the workflows including functions accepted by the computer as caused by the first program code, and said at least one execution condition being accepted by the computer as caused by the second program code.

6. A method for creating a workflow, comprising:
creating workflows using a workflow creating unit, the workflows constituted by combinations of multifunction-peripheral functions, the functions including
  execution-start conditions for starting execution of a workflow,
  continuation conditions for starting execution of a subsequent function after termination of execution of an immediately previous function, without selection of the subsequent function, and
  branch conditions for causing selection of a subsequent function from a plurality of functions, and starting execution of the selected subsequent function after termination of execution of an immediately previous function;

accepting the workflow functions via a function accepting unit; and accepting at least any one of the execution-start conditions, the continuation conditions, and the branch conditions as an at least one execution condition, via an execution condition accepting unit, the execution condition accepting unit therein accepting the status of execution of a function other than the workflow that contains said at least one execution condition itself, as the at least any one of the execution-start conditions, the continuation conditions, and the branch conditions; wherein the creating operates to create workflows including functions accepted by the function accepting unit, and said at least one execution condition accepted by the execution condition accepting unit.

7. The electronic device according to claim 1, wherein:
the execution condition accepting unit accepts as the at least any one of the continuation conditions the status of execution of a function other than the workflow that contains said at least any one continuation condition itself.

8. The electronic device according to claim 1, wherein:
the execution condition accepting unit accepts as the at least any one of the branch conditions the status of execution of a function other than the workflow that contains said at least any one branch condition itself.

9. The electronic device according to claim 1, wherein:
the execution condition accepting unit accepts as the at least any one of the execution-start conditions, the continuation conditions, and the branch conditions start of execution of a function other than the workflow that contains said at least one execution condition itself.

10. The electronic device according to claim 1, wherein:
the execution condition accepting unit accepts as the at least any one of the execution-start conditions, the continuation conditions, and the branch conditions termination of execution of a function other than the workflow that contains said at least one execution condition itself.

11. The electronic device according to claim 1, wherein:
the execution condition accepting unit accepts as the at least any one of the execution-start conditions, the continuation conditions, and the branch conditions change in execution of a function other than the workflow that contains said at least one execution condition itself.

12. The electronic device according to claim 1, wherein functions outside the workflows are carried out irrespective of the workflows.

* * * * *